(12) United States Patent
Marangoni

(10) Patent No.: US 8,940,354 B2
(45) Date of Patent: Jan. 27, 2015

(54) POLYMER GELATION OF OILS

(75) Inventor: Alejandro Gregorio Marangoni, Guelph (CA)

(73) Assignee: Mars, Incorporated, McLean, VA (US)

( * ) Notice: Subject to any disclaimer, the term of this patent is extended or adjusted under 35 U.S.C. 154(b) by 168 days.

(21) Appl. No.: 13/377,471

(22) PCT Filed: Jun. 11, 2010

(86) PCT No.: PCT/IB2010/001471
§ 371 (c)(1),
(2), (4) Date: Apr. 10, 2012

(87) PCT Pub. No.: WO2010/143066
PCT Pub. Date: Dec. 16, 2010

(65) Prior Publication Data
US 2012/0183663 A1 Jul. 19, 2012

Related U.S. Application Data

(60) Provisional application No. 61/213,480, filed on Jun. 12, 2009, provisional application No. 61/213,738, filed on Jul. 8, 2009.

(51) Int. Cl.
| A23D 9/007 | (2006.01) |
| A23D 9/02 | (2006.01) |
| A23L 1/0534 | (2006.01) |
| A23G 1/40 | (2006.01) |
| A23G 1/36 | (2006.01) |
| A23G 1/54 | (2006.01) |

(52) U.S. Cl.
CPC ........ *A23G 1/40* (2013.01); *A23D 9/007* (2013.01); *A23D 9/02* (2013.01); *A23G 1/36* (2013.01); *A23G 1/54* (2013.01); *A23L 1/0534* (2013.01)
USPC ........... 426/601; 426/573; 426/578; 426/641; 426/646

(58) Field of Classification Search
None
See application file for complete search history.

(56) References Cited

U.S. PATENT DOCUMENTS

| 1,768,230 | A | 6/1930 | Borg |
| 2,586,615 | A | 2/1952 | Sherwood |
| 2,626,216 | A | 1/1953 | Sherwood |
| 2,760,867 | A | 8/1956 | Kempf |
| 2,863,772 | A | 12/1958 | Kempf |
| 2,904,438 | A | 9/1959 | Orourke |
| 2,951,763 | A | 9/1960 | Keily et al. |
| 3,171,748 | A | 3/1965 | Hendrik |
| 3,218,174 | A | 11/1965 | Gian-Franco |
| 3,471,303 | A * | 10/1969 | Hamdy et al. ........... 426/89 |
| 3,471,304 | A * | 10/1969 | Hamdy et al. ........... 426/89 |
| 3,491,677 | A | 1/1970 | Bracco |
| 3,638,553 | A | 2/1972 | Kreuter |
| 3,935,319 | A * | 1/1976 | Howard ................ 426/104 |
| 4,041,188 | A | 8/1977 | Cottier et al. |
| 4,045,583 | A | 8/1977 | Jeffery et al. |
| 4,061,786 | A * | 12/1977 | Winkler et al. .......... 426/138 |
| 4,081,559 | A | 3/1978 | Jeffrey |
| 4,098,913 | A | 7/1978 | Baugher |
| 4,157,405 | A | 6/1979 | Itagaki et al. |
| 4,182,778 | A * | 1/1980 | Hall et al. ............... 426/72 |
| 4,199,611 | A | 4/1980 | Ito et al. |
| 4,256,505 | A * | 3/1981 | Zweigle et al. .......... 106/169.25 |
| 4,357,168 | A * | 11/1982 | Zweigle et al. .......... 106/162.7 |
| 4,446,166 | A | 5/1984 | Giddey et al. |
| 4,543,282 | A * | 9/1985 | Hammer et al. .......... 138/118.1 |
| 4,664,927 | A | 5/1987 | Finkel |
| 4,705,692 | A | 11/1987 | Tanaka et al. |
| 4,726,959 | A | 2/1988 | Momura et al. |
| 4,837,041 | A | 6/1989 | Maruzeni et al. |
| 4,839,192 | A | 6/1989 | Sagi et al. |
| 4,844,129 | A * | 7/1989 | Bridgeford et al. ........ 138/118.1 |
| 4,847,105 | A | 7/1989 | Yokobori et al. |
| 4,853,235 | A | 8/1989 | Tomomatsu |
| 4,855,152 | A | 8/1989 | Nakano et al. |
| 4,873,109 | A | 10/1989 | Tanaka et al. |
| 4,877,636 | A | 10/1989 | Koyano et al. |
| 4,882,192 | A | 11/1989 | Maeda et al. |
| 4,895,732 | A | 1/1990 | Suwa et al. |
| 4,923,708 | A | 5/1990 | Given |
| 5,004,623 | A | 4/1991 | Giddey et al. |

(Continued)

FOREIGN PATENT DOCUMENTS

| AR | 078079 | 10/2011 |
| CA | 2298199 A1 | 8/2000 |

(Continued)

OTHER PUBLICATIONS

Potter, Norman. 1973. Food Science, $2^{nd}$ edition. The AVI Publishing Company, Inc., Westport, CT. p. 50-51.*

(Continued)

*Primary Examiner* — Carolyn Paden
(74) *Attorney, Agent, or Firm* — Mars, Incorporated; Colleen Kramer

(57) ABSTRACT

An edible oleogel comprising an oil, ethylcellulose and a surfactant is prepared by combining ethylcellulose with an edible oil and a surfactant, and heating the mixture to a temperature above the glass transition temperature of the ethylcellulose. Once the ethylcellulose has fully dissolved and the solution is clear, it is allowed to cool and set as a gel. The resulting oleogel is homogeneous, elastic, substantially anhydrous, and has a gelation temperature below 100° C. It can be used as a fat substitute in foods. Also provided are methods of making the oleogel, and food compositions containing the oleogel.

28 Claims, 5 Drawing Sheets

(56) References Cited

U.S. PATENT DOCUMENTS

| | | | |
|---|---|---|---|
| 5,108,769 A | 4/1992 | Kincs | |
| 5,139,800 A * | 8/1992 | Anderson et al. | 426/243 |
| 5,149,560 A | 9/1992 | Kealey | |
| 5,160,760 A | 11/1992 | Takemori et al. | |
| 5,190,786 A | 3/1993 | Anderson et al. | |
| 5,232,734 A | 8/1993 | Takemori et al. | |
| 5,279,846 A | 1/1994 | Okumura | |
| 5,324,533 A | 6/1994 | Cain et al. | |
| 5,326,581 A | 7/1994 | Higashioka et al. | |
| 5,344,664 A | 9/1994 | Fitch et al. | |
| 5,348,758 A | 9/1994 | Fuisz et al. | |
| 5,409,726 A * | 4/1995 | Stanley et al. | 426/573 |
| 5,424,090 A | 6/1995 | Okawauchi et al. | |
| 5,431,947 A | 7/1995 | Bennett et al. | |
| 5,431,948 A | 7/1995 | Cain et al. | |
| 5,439,695 A | 8/1995 | Mackey | |
| 5,445,843 A | 8/1995 | Beckett | |
| 5,476,676 A | 12/1995 | Cain et al. | |
| 5,486,049 A | 1/1996 | Boatman et al. | |
| 5,486,376 A | 1/1996 | Alander | |
| 5,505,982 A | 4/1996 | Krawczyk | |
| 5,523,110 A | 6/1996 | Mandralis et al. | |
| 5,538,748 A | 7/1996 | Boatman et al. | |
| 5,556,659 A | 9/1996 | De Pedro et al. | |
| 5,753,296 A | 5/1998 | Girsh | |
| 5,876,774 A | 3/1999 | Nalur et al. | |
| 5,882,709 A | 3/1999 | Zumbe | |
| 5,902,621 A | 5/1999 | Beckett et al. | |
| 5,928,704 A | 7/1999 | Takeda et al. | |
| 5,965,179 A | 10/1999 | Ducret et al. | |
| 6,010,735 A | 1/2000 | Frippiat | |
| 6,025,004 A | 2/2000 | Speck et al. | |
| 6,051,267 A | 4/2000 | Jury et al. | |
| 6,063,408 A | 5/2000 | Yamazaki | |
| 6,165,540 A | 12/2000 | Traitler et al. | |
| 6,187,323 B1 | 2/2001 | Aiache et al. | |
| 6,251,448 B1 | 6/2001 | DeStephen | |
| 6,258,398 B1 | 7/2001 | Okada et al. | |
| 6,488,979 B1 | 12/2002 | Davila et al. | |
| 6,737,100 B1 | 5/2004 | Matsui et al. | |
| 6,773,744 B1 | 8/2004 | Ward et al. | |
| 6,783,783 B2 | 8/2004 | Clark et al. | |
| 6,805,889 B1 | 10/2004 | Jury | |
| 6,841,186 B2 | 1/2005 | Davila et al. | |
| 7,427,420 B2 | 9/2008 | Senba et al. | |
| 7,579,031 B2 | 8/2009 | Simbuerger et al. | |
| 7,727,574 B1 | 6/2010 | Ushioda et al. | |
| 7,736,685 B2 | 6/2010 | Parsons et al. | |
| 7,811,621 B2 | 10/2010 | Jury | |
| 7,935,368 B2 | 5/2011 | Yamada | |
| 8,017,163 B2 | 9/2011 | Simbuerger | |
| 8,088,431 B2 | 1/2012 | Ward et al. | |
| 8,231,923 B2 | 7/2012 | Okochi et al. | |
| 8,293,314 B2 | 10/2012 | Bruese et al. | |
| 8,323,015 B2 | 12/2012 | Day et al. | |
| 8,545,921 B2 | 10/2013 | Gonus et al. | |
| 8,607,980 B2 | 12/2013 | Aldridge et al. | |
| 8,790,737 B2 | 7/2014 | Miguel et al. | |
| 8,795,759 B2 | 8/2014 | Cantz | |
| 8,802,178 B2 | 8/2014 | Wang et al. | |
| 2008/0248186 A1 | 10/2008 | Bruse | |
| 2009/0246330 A1 | 10/2009 | Zhong | |
| 2010/0196550 A1 | 8/2010 | Mussumeci et al. | |
| 2012/0183663 A1 * | 7/2012 | Marangoni | 426/574 |

FOREIGN PATENT DOCUMENTS

| | | | |
|---|---|---|---|
| CA | 2702493 | | 11/2011 |
| CH | 399891 | | 9/1965 |
| CH | 409603 | | 3/1966 |
| CH | 410607 | | 3/1966 |
| CH | 489211 | | 4/1970 |
| CH | 519858 | | 3/1972 |
| CN | 101288414 | | 10/2008 |
| CN | 101448414 A | | 6/2009 |
| CN | 102187930 | | 9/2011 |
| EP | 0206850 | | 12/1986 |
| EP | 0407347 | | 1/1991 |
| EP | 0426155 | | 5/1991 |
| EP | 0442324 | | 8/1991 |
| EP | 0688506 | | 12/1995 |
| EP | 0958747 | | 11/1999 |
| EP | 0724835 | | 11/2000 |
| EP | 1120455 | | 8/2001 |
| EP | 2386206 | * | 11/2011 |
| GB | 317335 | | 8/1929 |
| GB | 847340 | | 9/1960 |
| GB | 904197 | | 8/1962 |
| GB | 1219996 | | 1/1971 |
| GB | 1538750 | | 1/1979 |
| GB | 2003912 | | 3/1979 |
| GB | 2028862 | | 3/1980 |
| GB | 2168071 | | 6/1986 |
| GB | 2391448 | | 2/2004 |
| GB | 2445539 A | | 7/2008 |
| JP | 52148662 | | 12/1977 |
| JP | 5338665 | | 4/1978 |
| JP | 5359072 | | 5/1978 |
| JP | 5399362 | | 8/1978 |
| JP | 56127052 | | 10/1981 |
| JP | 57152852 | | 9/1982 |
| JP | 5914752 | | 1/1984 |
| JP | 6058052 | | 4/1985 |
| JP | 60207549 | | 10/1985 |
| JP | 61139338 | | 6/1986 |
| JP | 61224935 | | 10/1986 |
| JP | 61293344 | | 12/1986 |
| JP | 62122556 | | 6/1987 |
| JP | 6356250 | | 3/1988 |
| JP | 63192344 | | 8/1988 |
| JP | 02163039 | | 6/1990 |
| JP | 04258252 | | 9/1992 |
| JP | 04281744 | | 10/1992 |
| JP | 5227887 | | 9/1993 |
| JP | 0622694 | | 2/1994 |
| JP | 07123922 | | 5/1995 |
| JP | 07264981 | | 10/1995 |
| JP | 08168343 | | 7/1996 |
| JP | 10165100 | | 6/1998 |
| JP | 2000109879 | | 4/2000 |
| JP | 2000166475 | | 6/2000 |
| JP | 2002209521 | | 7/2002 |
| JP | 2003225055 | | 8/2003 |
| JP | 2004298041 | | 10/2004 |
| JP | 2005034039 | | 2/2005 |
| JP | 2006109762 | | 4/2006 |
| WO | 9119424 | | 12/1991 |
| WO | 9203937 A2 | | 3/1992 |
| WO | 9319613 | | 10/1993 |
| WO | 9622696 A1 | | 8/1996 |
| WO | 9922605 | | 5/1999 |
| WO | 9945790 | | 9/1999 |
| WO | 9962497 A2 | | 12/1999 |
| WO | 03053152 | | 7/2003 |
| WO | 2006040127 | | 4/2006 |
| WO | 2007112077 A2 | | 10/2007 |
| WO | 2008081175 | | 7/2008 |
| WO | 2008081175 A2 | | 7/2008 |
| WO | 2008150169 | | 12/2008 |
| WO | 2009029577 | | 3/2009 |
| WO | 2010063076 | | 6/2010 |
| WO | 2011010105 | | 1/2011 |
| WO | 2011121337 | | 10/2011 |
| WO | 2012041629 | | 4/2012 |
| WO | 2012146920 | | 11/2012 |
| WO | 2012146921 | | 11/2012 |
| WO | 2013039831 | | 3/2013 |
| WO | 2013039873 | | 3/2013 |
| WO | 2013092643 | | 6/2013 |

OTHER PUBLICATIONS

Swern, D. 1979. Bailey's Industrial Oil and Fat Products, vol. 1, 4$^{th}$ edition. John Wiley & Sons, New York. p. 46-51.*

(56) References Cited

OTHER PUBLICATIONS

Goh, E. M. 1985. JAOCS 62(4)730.*
Siew, W et al. 1995. J. Sci Food Agric. 69:73.*
PCT International Search Report, PCT/IB2010/001471 mailed Oct. 29, 2010.
Almeida, I.F.; Bahia, M.F., Evaluation of the physical stability of two oleogels, International Journal of Pharmaceutics, Dec. 11, 2006, pp. 73-77, vol. 327 (1-2), Elsevier, Portugal.
Ruiz Martinez, M.A., et al., Influene of the concentration of a gelling agent and the type of surfactant on the theological characteristics of oleogels, IL FARMACO, Dec. 2003, pp. 1289-1294, vol. 58 (12), Elsevier, Spain.
Bourne, "Texture Profile Analysis", Food Technology, Jul. 1978, pp. 62-66, vol. 32.
Chocolate Specifications, The Gazette of India, pp. 380-381, 484-486, Part III-Sec.4.
Dicolla, "Characterization of Heat Resistant Milk Chocolates", MS Thesis, Food Science, Pennsylvannia State University, Feb. 26, 2009.
Killian, "Development of Water-in-Oil Emulsions for Application to Model Chocolate Products", May 2, 2012.
Stortz, et al., "Heat Resistant Chocolate", Trends in Food Science & Technology, 2011, pp. 201-214, 22.

* cited by examiner

Ethylcellulose Powder (Amorphous) $T_g \approx 130°C$

Effect of oil type on polymer gel hardness

POLYMER GELATION OF OILS

RELATED APPLICATIONS

The present invention claims priority of U.S. 61/213,480 filed on 12 Jun. 2010 and U.S. 61/213,738 filed on 8 Jul. 2010, the entire contents of which are incorporated herein by reference.

FIELD OF THE INVENTION

The present invention relates to oils that are gelled with a combination of ethylcellulose and a surfactant.

BACKGROUND OF THE INVENTION

Over the past 50 years hydrogenated oils containing trans fatty acids have become a prevalent part of the diet in developed countries. Research into the role fats and oils play in human health has indicated that consumption of trans fatty acids is associated with increased incidences of cancer, heart disease, elevated cholesterol levels and a host of other health problems. Although many consumers are aware of the negative impact of trans fats, these hydrogenated oils have become so commonplace in prepared foods that it is a major feat to avoid them.

The demand for a healthy alternative to trans fatty acids and saturated fats creates technological hurdles for the food manufacturing industry. It is difficult to eliminate trans and saturated fats from a food formulation where the goal is to transform an oil, which is liquid at room temperature to a fat, which is 'solid' at room temperature to enhance the texture and appearance of a food product.

In the food industry there have been many attempts to find alternative components that can provide the desired features of texture, structuring, stability and taste that are normally found in animal and vegetable fats or hydrogenated oils. One alternative, organogels, have been recognized for their potential to be used to reduce oil migration in multi component foods and to act as an alternative to butter or margarine. Organogels can be used to provide structure to edible oils thereby reducing the need for saturated and trans fatty acids. While the potential of organogels as soft materials for use in the food industry is recognized, there is a lack of good food grade organogelators. There remains an unmet need for food grade compositions that can provide the functionality and properties of a solid fat at a reasonable cost.

U.S. Pat. No. 6,187,323 describes pharmaceutical and cosmetic compositions comprising a mixture of a gelled oil and an aqueous gel. The oil may be gelled with ethylcellulose by heating to 140° C. to dissolve the ethylcellulose.

WO2008/081175 describes compositions containing an active agent for cosmetic and pharmaceutical applications, similar to those of U.S. Pat. No. 6,187,323. The compositions are homogeneous mixtures (not emulsions) of an oil component with an aqueous component. The oil component is gelled with ethylcellulose at 120° C. or 150° C. prior to mixing with the aqueous component. The aqueous component is gelled with a conventional cosmetic gelling agent.

U.S. Pat. No. 4,098,913 describes edible fat particles for incorporation into textured protein meat analog products. The edible fat products are made by gelling an oil with ethylcellulose at 180° C. The gelled fat is then added to the meat analog product. There does not appear to be any disclosure of including a surfactant in the gelled oil.

M. A. Ruiz-Martinez et al. in *Il Farmaco*, 58 (2003) 1289-1294 describe compositions formed by dispersing ethylcellulose with certain polyethylene glycol (PEG)-olivate ester surfactants in olive oil at 100° C. Although these compositions are described as oleogels, the description and rheological data in the reference confirm that they are not, in fact, gels. In particular, the measured ratios of elastic modulus to viscous modulus (G'/G") for the compositions are much less than 1 when measured at 1 Hz, which is consistent with viscous liquids or pastes but not gels.

SUMMARY OF THE INVENTION

In the methods of the present invention, liquid edible oils are physically transformed into stable semisolid anhydrous oil gel compositions. The compositions allow for a dramatic reduction in the amount of unhealthy trans and saturated fat used in food products. The compositions of the invention are useful in many applications. Some examples of their use are the stabilization of oils in foods at high temperatures (soaks up and binds oil relatively strongly and prevents syneresis), the replacement of solid fat in meat products, the gelling and stabilization of fish and algal oils for ruminant feeding, and the manufacture of heat resistant chocolate, just to mention a few.

In a first aspect, the present invention provides an edible oleogel comprising an oil, ethylcellulose and a surfactant.

The oleogels according to the invention are edible. Accordingly, in a further aspect, the present invention provides a food product comprising an oleogel according to the invention In a further aspect, the present invention provides a method of preparing an edible oleogel, said method comprising:

a) preparing a mixture of food-grade ethylcellulose in an edible oil;

b) adding a surfactant to the ethylcellulose and oil mixture;

c) heating the ethylcellulose/oil/surfactant mixture to a temperature above the glass transition temperature of the ethylcellulose with mixing, and d) allowing the mixture to cool thereby forming said oleogel.

Suitably, the method is adapted for making an oleogel according to the first aspect of the invention.

DESCRIPTION OF THE DRAWINGS

These and other features of the invention will become more apparent from the following description in which reference is made to the appended drawings wherein.

DETAILED DESCRIPTION OF THE INVENTION

Figure 1:
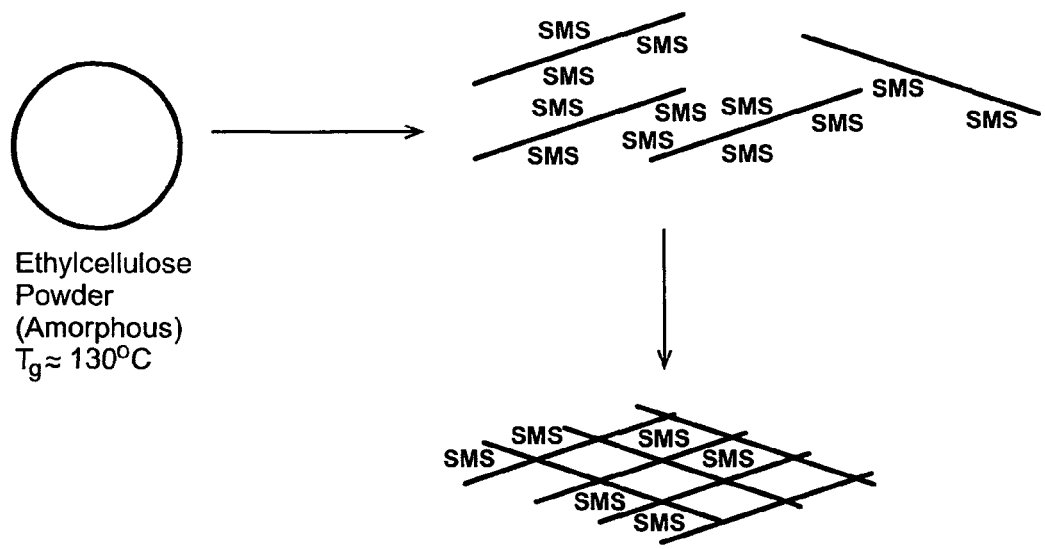
FIG. 1 is a schematic illustrating the formation of a polymer organogel by heat treatment.

The invention is directed to edible semi-solid, anhydrous polymer/oil/surfactant gels and to food products containing such gels.

The polymer gels are suitably prepared by combining ethylcellulose with an edible oil and a surfactant, and heating the mixture to a temperature above the glass transition temperature of the ethylcellulose. Once the polymer has fully dissolved and the solution is clear, it is allowed to cool and set as a gel.

The term "gel" herein is used in its usual sense of a material having a continuous structure with macroscopic dimensions that is permanent on the time scale of an analytical experiment and is solid-like in its rheological properties (Flory, 1974). Gels bounce rather than flow, and exhibit substantially linear viscoelastic characteristics, at stresses below their yield stress. Gels have a melting point. Gels are conveniently defined by their rheological properties, in particular their yield stress and the ratio of their elastic modulus to their viscous modulus (G'/G") as measured at 20° C. and 1 Hz in a conventional viscoelastic analyzer as described below. Gel-like behaviour is characterized by G'/G" greater than about 1 under these conditions. The gels of the present invention suitably have yield stresses greater than about 10 Pa, more suitably greater than about 20 Pa, for example from about 25 Pa to about 300 Pa. The gels of the present invention suitably have G'/G" greater than about 1, more suitably greater than about 2 under these conditions.

The gels according to the invention are suitably strong gels. Strong gels are preferred for food applications because they have physical properties closer to those of fat, and are more effective for reducing oil migration. The term "strong gel" herein refers to gels having high mechanical strength and elasticity. Suitably, strong gels have yield stresses greater than about 50 Pa and G'/G" greater than about 3 at 1 Hz and 20° C.

The term "oleogel" herein refers to a gel having a continuous oil phase having the ethylcellulose uniformly dispersed in the gel phase and functioning as the gelling agent. The oleogels are suitably clear and translucent, generally transparent materials having the physical properties of a true gel as described above. The surfactant is likewise homogeneously distributed through the gel. Thus, the surfactant is not concentrated at the surface of oil or water micelles as in an emulsion. The oleogel may consist essentially of one or more oils or fats, the ethylcellulose, and the surfactant. The oleogel is suitably anhydrous, that is to say it suitably has a water content of less than about 10% w/w, for example less than about 5% w/w.

The polymer oleogel is what some call a macromolecular gel, resembling a single-phase system at length scales greater than 100 nm. Polymer strands form a crosslinked network where structures can be recognized only a very small length scales, in the range of polymer dimensions. This is in contrast to colloidal gels, where particles ranging from a few hundred nanometers to several micrometers are evident. The polymer oleogel is unique in that its structure is homogeneous at the mesoscale, whereas other organogels are not homogeneous at this length scale.

The oleogels according to the invention are edible. Accordingly, in a further aspect, the present invention provides a food product comprising an oleogel according to the invention. The food product may be made by mixing food components with an oleogel according to the invention. The mixing may be performed with the oleogel in the gelled state, or with the oleogel composition in the molten state followed by cooling.

The term "food product" herein refers to edible products suitably also containing one or more ingredients selected from carbohydrates (e.g. sugars and starches), proteins, dietary fiber, water, and flavouring agents such as salt. The term does not encompass pharmaceutical or cosmetic products, such as products containing pharmaceutically ingredients, non-food acceptable detergents or perfumes. Suitably, the food product contains at least about 1 wt. % of the oleogel, for example at least about 5 wt %, 10% or 15% of the oleogel. Suitably, the food product contains less than about 95% of the oleogel, for example less than about 90% of the oleogel.

In certain embodiments, the food product according to the present invention is a meat product. For example, a ground meat product such as hamburger meat, or a meat emulsion product such as bologna, mortadella, frankurters, or other sausage products. Typically, the meat products of the invention comprise from about 10% to about 25% of protein, from about 5% to about 35% of fat (including oils and gelled oils), and from about 40% to about 60% total water.

Typically, meat emulsion products are prepared by mixing, chopping, and emulsifying a mixture of raw meat materials such as lean skeletal beef and pork, and meat by-products, with ice, and non-meat ingredients such as salt, spices, non-meat proteins and curing salts in such a manner as to produce an emulsion that contains fine fat particles coated with protein. The protein is either dissolved from meat ingredients and/or derived from added proteins such as vegetable proteins, whey or plasma proteins. In the case of a sausage product, the resultant meat emulsion is then stuffed into a suitable casing that serves as a processing mold. The emulsion is then heat processed. The heating of the meat emulsion causes the protein contained therein to coagulate to form an elastic, semi-solid texture. This thereby entraps the fat particles in the protein matrix thereby forming a firm meat emulsion product. The resultant meat emulsion product is a uniform, homogeneous mass that may also contain discrete chunks of meat or other inclusions and retains the shape of the casing when set.

Replacement of a fraction of the animal fat present in such products by oils, suitably vegetable oils, results in meat products having an unacceptably hard, chewy and/or gummy texture when cooked. However, replacement of a fraction of the animal fat by an oleogel according to the present invention has been found to result in meat products that do not exhibit these drawbacks.

The present inventor has found that the strength of the gel formed by dispersing ethylcellulose and a surfactant in oil depends on the choice of ethylcellulose, the oil, the surfactant, and the dispersion temperature.

Various types of oils may be used such as, but not limited to, Soybean oil, Canola oil, Corn oil, Sunflower oil, Safflower oil, Flaxseed oil, Almond oil, Peanut oil, Fish oil, Algal oil, Palm oil, Palm stearin, Palm olein, Palm kernel oil, high oleic soybean, canola, sunflower, safflower oils, hydrogenated palm kernel oil, hydrogenated palm stearin, fully hydrogenated soybean, canola or cottonseed oils, high stearic sunflower oil, Olive oil, enzymatically and chemically interesterified oils, butteroil, cocoa butter, avocado oil, almond oil, coconut oil, cottonseed oil, and mixtures thereof. A portion, for example up to about 50% w/w, of the oils may be replaced by one or more fats.

Soybean oil forms very strong gels, and so does corn oil and flaxseed oil. Canola oil and the high oleic oils, on the other hand form weaker gels. Flaxseed oil and most highly polyunsaturated nut, algal and fish oils form very strong gels. It would seem that oils that are high in polyunsaturates such as linoleic, linolenic, DHA and EPA acids form the strongest gels, while oils with high oleic acid contents do not form as strong gels. Suitably, the gelled oils in the compositions of the present invention comprise less than about 50% of olive oil, for example they may be substantially free of olive oil. More highly polyunsaturated oils are also more polar and of higher density than more saturated oils. Considering all of the above, for general fat applications, soybean oil or corn oil are preferred oils for the formation of gels. Medium and short-chain saturated fats and oils (MCTs) such as palm kernel oil and coconut oils also form strong gels. Suitably, the gelled oils in the compositions of the present invention comprise less than about 50% of olive oil, for example they may be substantially free of olive oil.

Suitably, the oleogels of the invention comprise from about 70% to about 95% of oils (including any fats), for example about 80% to about 90% of oils.

The addition of a surfactant to the polymer-oil mixture has been shown to result in the formation of desired polymer gels. Examples of surfactant/solvent components include, but are not limited to Polyoxyethylene sorbitan monooleate (Tween 80), Polyoxyethylene sorbitan monostearate (Tween 60), Sorbitan monooleate (SMO or Span 80), Sorbitan monostearate (SMS or Span 60), Glyceryl monooleate (GMO), Glyceryl monostearate (GMS), Glyceryl monopalmitate (GMP), Polyglyceryl ester of lauric acid-polyglyceryl polylaurate (PGPL), Polyglyceryl ester of stearic acid polyglyceryl polystearate (PGPS), Polyglyceryl ester of oleic acid (PGPO)-Polyglyceryl polyoleate (PGPO), and Polyglyceryl ester of ricinoleic acid (PGPR)-Polyglyceryl polyricinoleate (PGPR).

The addition of a compatible surfactant plasticizes the polymer, slows down the gelation process (increases the gelation time) and induces the formation of stable, translucent, elastic, non-brittle gels. The surfactant does not lower the temperature that is needed to disperse ethylcellulose in oil initially (see below), but the surfactant does decrease the gelation temperature on cooling of the polymer/surfactant/oil solution and the melting temperature of the gel after it has formed. Suitably, the gelation temperature of the gel is reduced to from about 40° C. to about 90° C., for example about 60° C. to about 80° C., by the surfactant. Gelled oils that set above 100° C. would not be practical in most food combinations, as heating the food product to such high temperature for inclusion of the polymer solution would destroy or severely modify the native food structure. Moreover, a fast gelation process would make it very difficult for these polymers to be added to food products—they would set into a gel too fast for proper incorporation and mixing. A preferred surfactant for use in foods is one that decreases the gelation temperature and slows down the gelation process.

Preferred surfactants were determined to be SMS, GMS, GMO, SMO and PGPL.

It will be apparent from the above that the surfactant is normally a non-ionic surfactant. Especially strong gels are observed when the surfactant is an ester of a saturated C10-C24, suitably C14-C20, fatty acid with a polyhydric alcohol such that the ester has 2, 3 or more free hydroxyl groups. Suitable saturated fatty acids include stearic (C18) and palmitic (C16) acids. Suitably, the polyhydric alcohol has at least four hydroxyl groups, such as a sugar alcohol or a polyglycerol. An especially suitable surfactant of this type is SMS.

The mouthfeel of SMS and SMO are superior to the other surfactants.

Surfactant esters of unsaturated fatty acids, such as GMO and SMO, are extremely good plasticizers, to the point where the reduction in gelation temperature can be too extreme, leading to the formation of a gel with decreased thermal resistance. This translates into a need to have a higher polymer concentration in the final product. PGPL is a very good plasticizer, but overheating of PGPL can lead to the hydrolysis of lauric acid, which has a very undesirable taste. Suitably, the surfactants used in the present invention do not comprise PEG olivate esters, more particularly Olivem 900, 700 or 300.

There is a limit to how much surfactant can be added to foods. The practical range is a 10:1 to 1:1 w/w polymer-to-surfactant ratio. A ratio of from about 4:1 to about 2:1 w/w for example 3:1 w/w polymer-to-surfactant was found to be a good compromise between obtaining good gel strength and minimizing the amount of surfactant added in a food product.

Ethylcellulose (EC) has been shown to form anhydrous polymer organogels of edible oils at concentrations greater than 3% (w/w) in oil. To achieve this, the EC and surfactant in oil is heated up to a temperature above the glass transition temperature of the polymer (Tg=130° C.) with constant mixing. Suitably, the mixture is heated to at least about 130° C., for example about 135° to about 160° C., typically about 140° to about 150° C. It has been found that the initial dispersion temperature above the glass transition temperature of the ethylcellulose is important to achieve complete dissolution of the ethylcellulose and a strong gel. After a few minutes, all the EC powder has dissolved and the solution is clear and very viscous (depending on the concentration of EC in oil). The useful concentration range is between 4% and 20% (w/w) EC in oil, for example from about 4% to about 10% w/w. EC will gel oil by itself; stable gels can be produced that are translucent and stiff, but they are grainy and brittle in nature, set very fast, and have a relatively high gelation temperature, typically about 110-120° C., which is not suitable for many food applications. Hence the addition of the surfactant provides important advantages in the compositions of the invention. The surfactant does not reduce the temperature required for the initial dissolution of the ethylcellulose, which remains the glass transition temperature even in the presence of the surfactant.

However, once the ethylcellulose has been dissolved to form the gel, the surfactant plasticises the gel to lower the gelation temperature and improve the properties of the formed gel.

Without wishing to be bound by any theory, the suggested mechanism of thermal gel formation and surfactant interaction is shown in FIG. 1. In this example SMS is the surfactant. It is apparent to one skilled in the art that the same type of schematic can be applied to other surfactants.

The molecular weight of the polymer plays a role in the formation of the gel. Ethylcellulose 4 cp, 10 cp, 22 cp, 45 cp, 100 cp, and 300 cp have been tested (cp=centipoise, a measure of the viscosity of a 5% solution of ethylcellulose in toluene; the greater the molecular weight, the higher the molecular weight of the ethylcellulose).

It has been found that EC 4 cp forms very weak gels even at 10% (w/w) concentrations. EC 100 cp and 300 cp are extremely high molecular weight polymer mixtures and are difficult to dissolve and mix, form very viscous sols, and set quickly at high temperatures (above 100° C.). This also enhances the incorporation of air bubbles into the melt, which is not desirable. Thus, the use of EC 100 cp and EC cp 300 is not very practical in most food applications. EC 10 cp, 22 cp and EC 45 cp form stiff, translucent and elastic gels at 5-6% (w/w) concentrations in the oil phase. EC 10 cp, 22 cp and 45 cp dissolve readily in the oil, the sols are not too viscous at 10-15% concentrations and they start gelling at temperatures between 70 and 90° C.

Ethylcellulose is a nutritionally beneficial fiber and nutritional fibers are often lacking in our diets, In addition, ethycellulose is a GRAS material (generally regarded as safe) for use in food products making EC, particularly EC 10 cp, 22 cp and EC 45 cp, are desirable polymers to be used in food products, more particularly EC 22 cp and EC 45 cp. The degree of ethoxylation of the ethylcellulose is suitably from about 25% to about 75%, for example from about 40% to about 60% by weight.

As discussed above, EC 22 cp is a preferred polymer for use in the invention. Assuming an approximate molecular weight of EC 22 cp of 40,000 g/mol and an approximate molecular weight of SMS of 430.62 g/mo, a 3:1 w/w polymer-to-surfactant ratio translates into a 1:31 mol/mol polymer-to-surfactant ratio. Considering the molecular weight of glucose as 180 g/mol, and of 50% substituted ethylglucose of 222 g/mol, and of a ethylglucose monomer in cellulose as 204 g/mol, this translates to approximately 196 monomers of glucose in EC22 cp. Thus 196/31=6, meaning that one molecule of SMS is bound to every sicth glucose monomer in the EC22 cp polymer. This is relevant since proper gel formation depends on a balance between polymer-solvent and polymer-polymer interactions. Too high a solubility of the polymer in the oil will preclude gel formation upon cooling. Not enough soluiblization will preclude proper polymer swelling and extension of the chains in the solvent, which will then interact and form junction zones upon cooling, leading to gelation. It appears that the strength of binding is an important factor, as well as polymer conformation.

Procedure 1

In order to assess the rheological properties of the gel, a controlled stress rheological test was performed. Circular 1 cm diameter by 3 mm high piece of the gel was cut out and placed on a piece of 60-grit wood sandpaper soaked in flaxseed oil. A piece of 60-grit wood sandpaper was glued to a 1 cm diameter flat stainless steel geometry. The gel sample on the oil-soaked piece of sandpaper (3×2 cm) were taped to the bottom Peltier plate of the rheometer. The sample was compressed manually to achieve a normal force of approximately 0.2 N to ensure good mechanical contact and no slip. The rheometer was programmed to carry out a stress sweep from 1 to 4000 Pa at a range of frequencies, including 1 Hz.

Procedure 2

The gelation temperatures of the ethylcellulose-surfactant-oil solutions were determined as follows. The solutions heated to above the glass transition temperature of the ethylcellulose were placed in heated 50 ml glass vials, placed in a metal rack and transferred to heated water bath. Solutions were stabilized at a particular temperature for 30 minutes before visually inspecting them for evidence of gelation. Gelation was judged by tilting the glass vial 90 degrees and visually checking for flow. If the solution was liquid and flowed, the temperature was lowered to a new set point. The temperature at which the sample did not flow any more was considered the gelation temperature.

Example 1

In one embodiment, a fat substitute is prepared as follows. Ethylcellulose 22 cp or 45 cp 9% w/w (ETHOCEL®, Dow Chemical Co.) and 3% w/w SMS in a 30:70 w/w mixture of fully hydrogenated soybean oil with liquid soybean oil were heated up 140° C. to ensure full solubilization of the polymer in oil. Upon cooling of the melt, at 100° C., soybean oil heated to 100° C. was added at a 1:2 ratio (1/3 dilution). The final concentration of components was 6% EC, 2% SMS, 20% fully hydrogenated soybean oil and 72% soybean oil. The mixture was then allowed to cool down and set. Fully hydrogenated cottonseed oil, fully hydrogenated canola oil, beef tallow, lard, milkfat could also be added as the hardstock. This material has the functionality and texture of a fat.

Example 2

In another embodiment, a fish oil gel for ruminant feeding is provided. Ethylcellulose 22 cp or 45 cp 9% w/w (source as in Example 1) and 3% w/w SMS in a 30:70 w/w mixture of fully hydrogenated soybean oil with liquid soybean oil were heated up 140° C. to ensure full solubilization of the polymer in oil. Upon cooling of the melt, at 90° C., fish or algal oil heated to 90° C. was added under reduced pressure or under a nitrogen blanket at a 1:2 ratio (1/3 dilution). The final concentration of components was 6% EC, 2% SMS, 20% fully hydrogenated soybean oil and 72% fish or algal oil. The material was hard enough that it could be cut into small pieces by chopping for inclusion into animal feed. Supplementation of cow feed with stabilized fish oil will protect the fish oil from biohydrogenation in the rumen of the cow, and thus allow the cow to accumulate DHA and EPA in the milk produced. Naturally secreted milk has a great potential as a source of long-chain omega-3 fatty acids.

Example 3

In a further embodiment, a 10% ethylcellulose 22 cp gel containing 5% sorbitan monostearate in flaxseed oil was prepared. The gel was prepared by the thermal treatment described above and allowed to set at 22° C. for one day. The rheological test results show that the test gel is very solid-like (firm gel), with a G'/G" value of about 4 at 1 Hz. The yield stress of the gel was 100-300 Pa.

Example 4

Figure 2A:
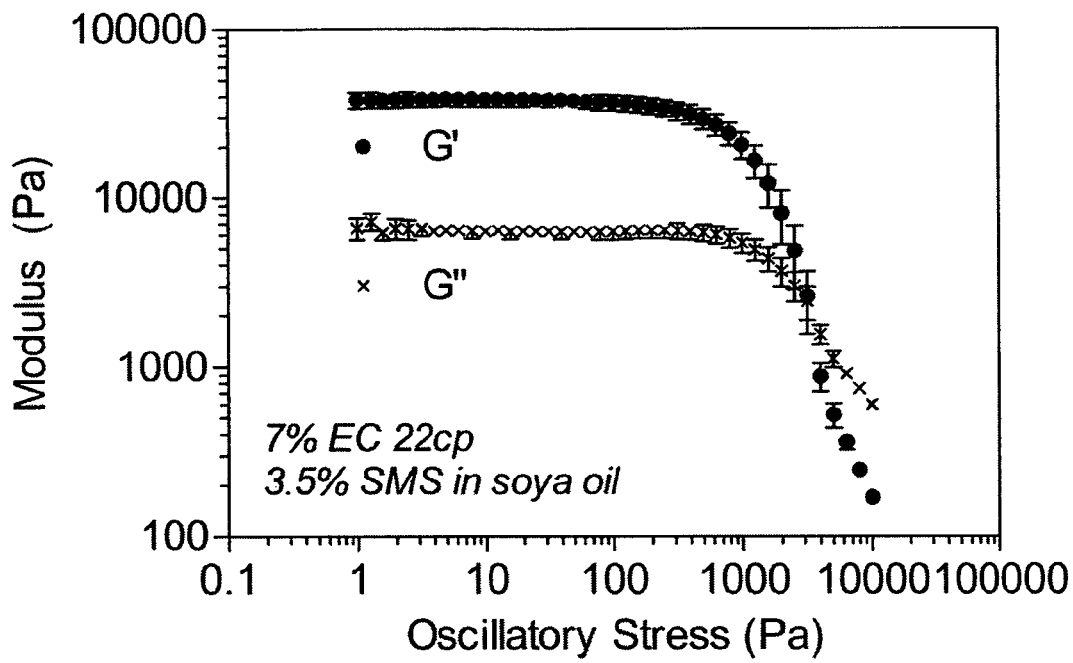
FIG. 2 shows measured viscoelastic data for the oleogel of Example 4.
Figure 2B:
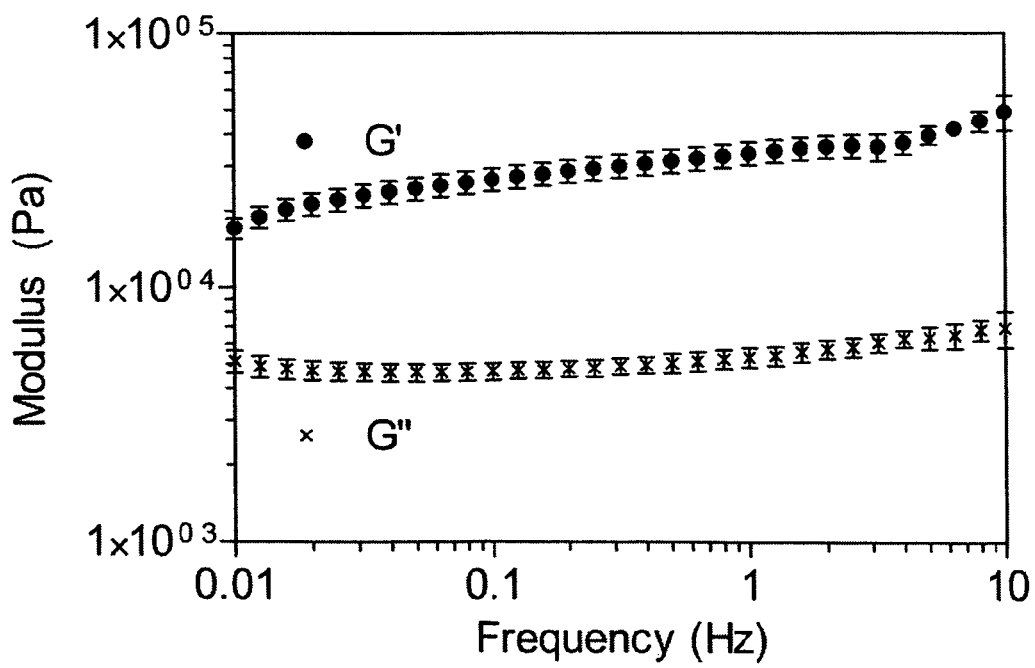
Figure 3A:
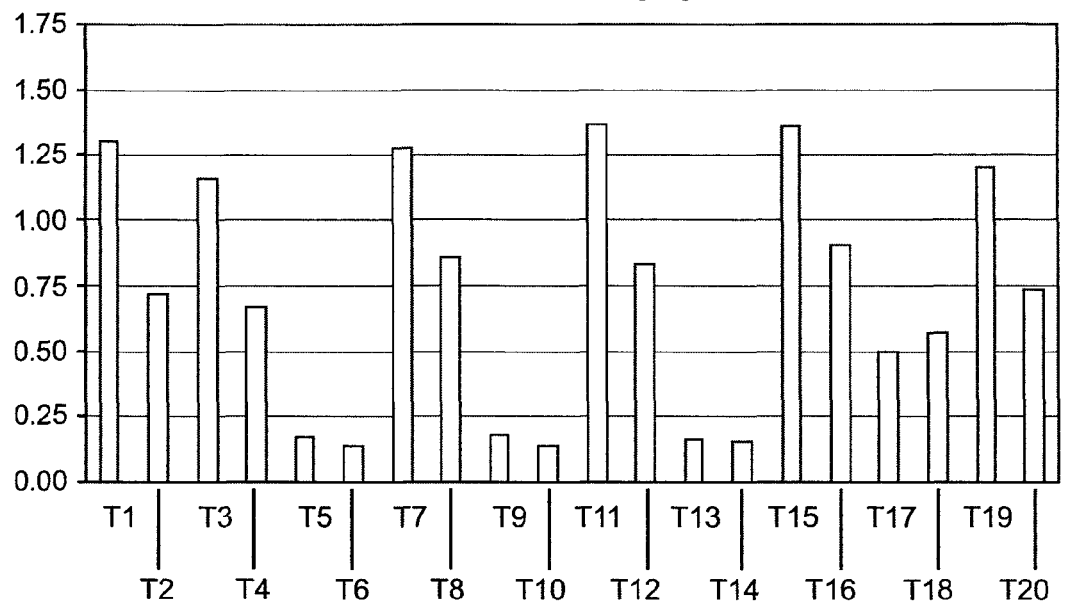
FIG. 3 shows measured data for (a) liquid loss, (b) hardness, (c) springiness, (d) cohesiveness, (e) chewiness and (f) gumminess of meat emulsion samples containing various oils, fats and oleogels according to the invention.
Figure 3B:
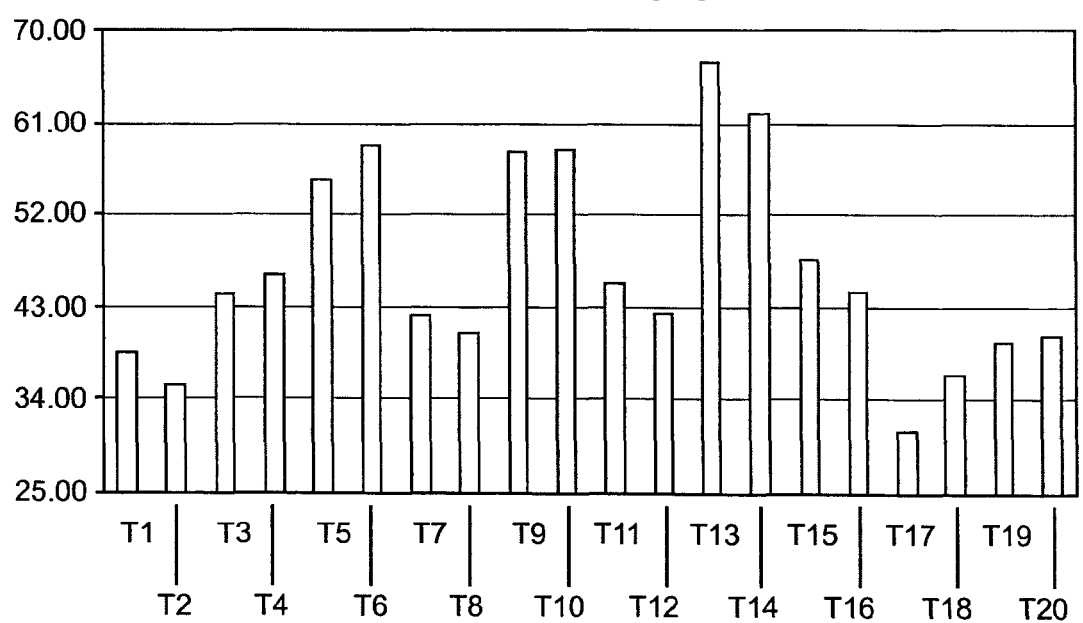
Figure 3C:
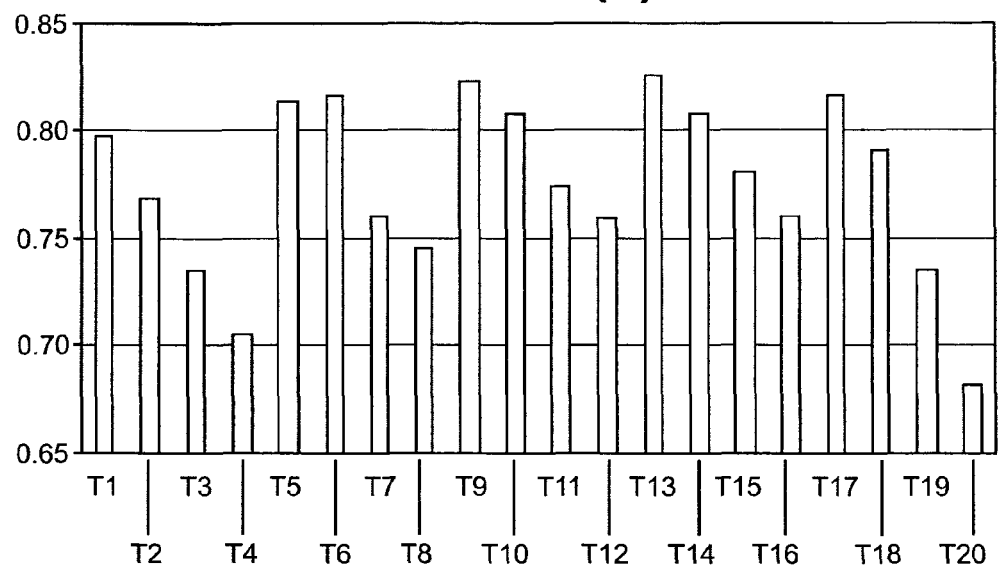
Figure 3D:
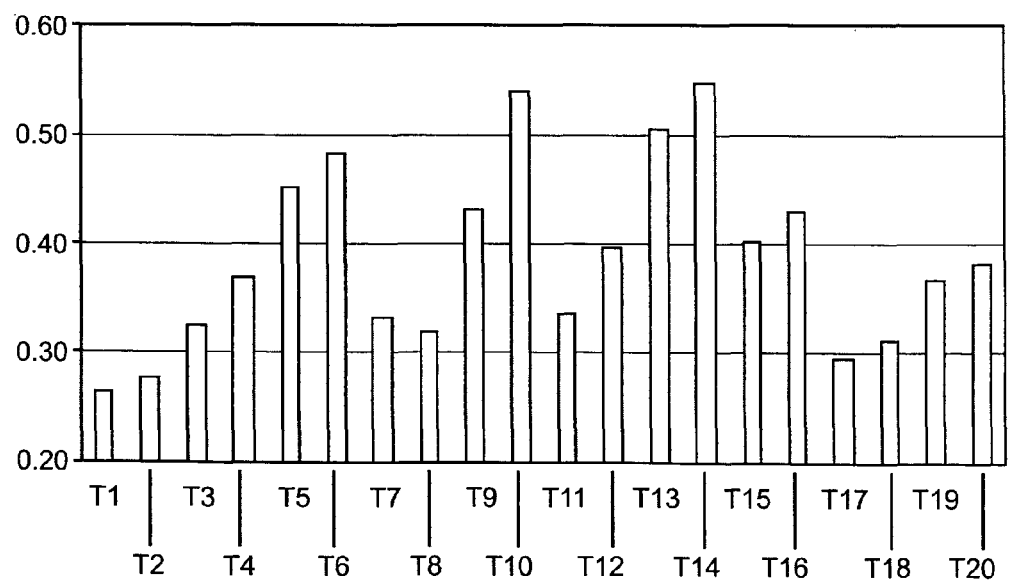
Figure 3E:
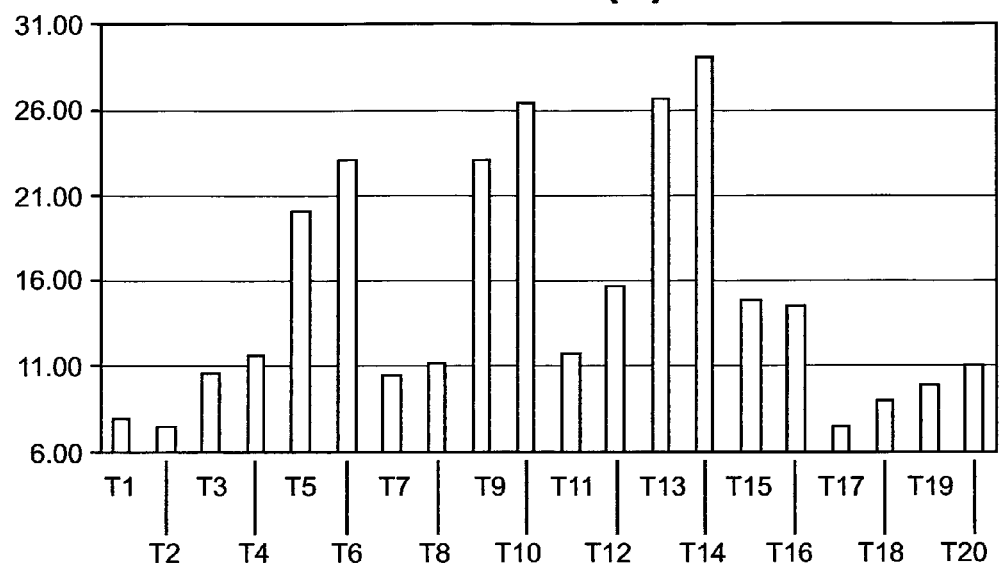
Figure 3F:
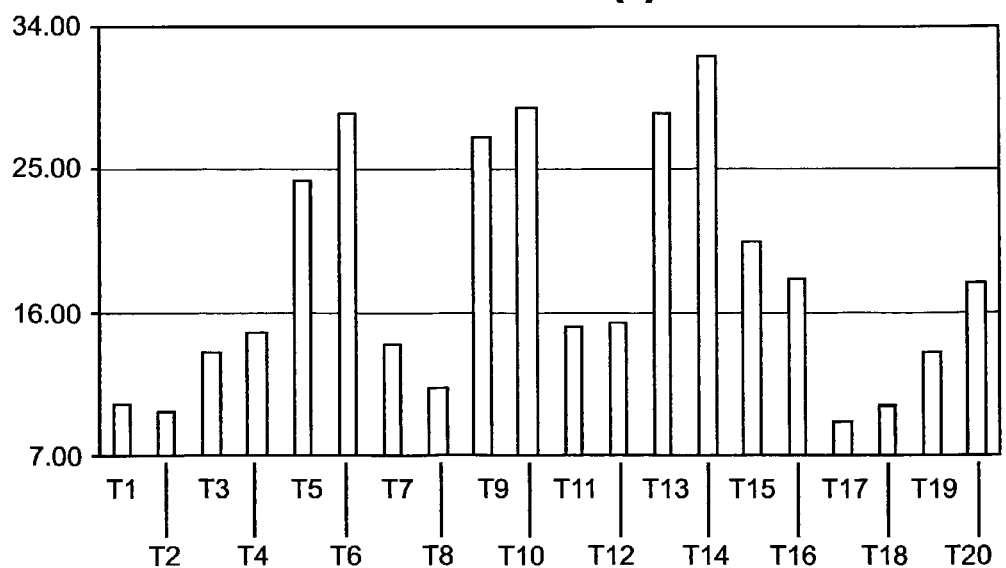

A gel of 7 wt. % ethylcellulose 22 cp, 3.5% SMS in soya oil was prepared and tested as described above in Example 1. The viscoelastic data are shown in FIG. 2. It can be seen that the gel shows classical gel behaviour with linear stress/strain behaviour up to a breakdown stress of about 1000 Pa, and with G'>>G" at 1 Hz.

Example 5

The effect of dissolution temperature of the ethylcellulose on the properties of the oleogel was studied as follows. A mixture was made consisting of 10% Ethocel 45 cP and 3% sorbitan monostearate in soybean oil. Samples were removed during heating of the mixture at 125° C., 130° C., 140° C. and 150° C. The particles in the oil began to clear around 125° C. However, they did not fully clear until around 130° C. The samples were left to set at room temperature (25° C.). After having set for 3 hr at ambient temperature it was clear that gel samples removed at 125 or 130° C. did not achieve nearly the same hardness as the samples heated to 140 or 150° C.

In general, samples herein containing EC, surfactant and oil were heated up to 140° C. with constant stirring for 30 minutes until all the EC was solubilized and the oil appeared translucent by visual inspection. When the samples were only heated up to 100° C., incomplete solubilization of the EC was evident, and large pieces of the EC could be seen by eye. Upon cooling to room temperature, these samples heated only to 100° C. did not gel and remained liquid. This demonstrates the importance of heating the EC in oil to above its glass transition temperature.

Example 6

The effect of varying the amount and type of surfactant on the gelation temperature of ethylcellulose oleogels was studied as follows. Gels were formed in the usual manner from Canola oil, ethylcellulose and various surfactants. After heating ingredients to 150° C. a small amount of molten gel was poured into the bottom of a test tube. The test tube was then immediately placed in a hot water bath at 97.5° C. The test tube was left at this temperature for 10 min. If after 10 min the gel showed no flow behaviour when inverted at an angle and gently shaken then the gelation temperature was recorded as >97.5° C. If flow behaviour was observed then the test tube was replaced into the bath. The temperature of the bath was then lowered 5° C. Once the lower temperature was reached, the tubes were left at this temperature for 10 min and then checked for gelation. This was repeated until gelation was observed. The measured gelation temperatures in ° C. were as follows:

TABLE 1

9% EC 1.8% Surfactant in Canola oil gels

| Surfactant | None | SMS | SMO | GMS | GMO |
|---|---|---|---|---|---|
| Ethocel cP 10 | 85 | 60 | 80 | 75 | 70 |
| Ethocel cP 20 | >97.5 | >97.5 | 90 | 90 | 90 |
| Ethocel cP 45 | >97.5 | >97.5 | 90 | 85 | >97.5 |

TABLE 2

9% EC 3% Surfactant in Canola oil gels

| Surfactant | None | SMS | SMO | GMS | GMO |
|---|---|---|---|---|---|
| Ethocel cP 10 | 85 | 85 | 85 | 75 | 75 |
| Ethocel cP 20 | >97.5 | 80 | 85 | 80 | 90 |
| Ethocel cP 45 | >97.5 | 85 | 85 | 90 | 95 |

It can be seen that the addition of surfactant lowers the gelation temperature. Gelation temperatures are higher for the higher viscosity (molecular weight) ethylcellulose.

Example 7

The effect of varying the amount and type of surfactant and of ethylcellulose on the viscoelastic properties of ethylcellulose oleogels was studied by preparing a series of oleogels by heating canola oil, ETHOCEL 22 cp and a surfactant in varying proportions to about 140° C. to dissolve the ethylcellulose, followed by measuring the viscoelastic properties of the resulting gels. The results were as follows:

TABLE 3

| | | EC 5% | EC 6% | EC 7% |
|---|---|---|---|---|
| | | SMO 2.50% | SMO 3% | SMO 4% | SMO 3.50% |
| G' [Pa] | Average | 3261 | 3933 | 2751 | — |
| G'' [Pa] | Average | 846 | 996 | 734 | — |
| G'/G'' | Average | 3.9 | 3.9 | 3.7 | — |
| | | SMS 2.50% | SMS 3% | SMS 4% | SMS 3.50% |
| G' [Pa] | Average | 4085 | 6762 | 24630 | 43088 |
| G'' [Pa] | Average | 976 | 1444 | 4029 | 7048 |
| G'/G'' | Average | 4.2 | 4.7 | 6.1 | 6.6 |

These data show that gel strength is dependent on EC concentration, and surfactant type and concentration. At a fixed 2:1 (w/w) ratio of EC 22 cp to SMS, the G' of an oleogel increases from 4085 Pa to 6762 Pa to 43088 Pa when the concentration of EC increases from 5% to 6% to 7%, respectively. Thus, EC concentration has a profound effect on gel strength. For a 6% EC 22 cp gel, increasing the polymer to surfactant ratio from 2:1 to 3:2 w/w leads to a large increase in G', from 6762 Pa to 24630 Pa. This demonstrates the sensitivity of gel strength on the presence of surfactant and the ratio of polymer to surfactant. In the case of EC 22 cp gels containing SMO at similar polymer to surfactant ratios, an increase in EC concentration from 5% to 6% leads to a small increase in G' from 3261 Pa to 3933 Pa. For a 6% EC 22 cp gel, increasing the polymer to surfactant ratio from 2:1 to 3:2, however, leads to a decrease in G' from 3933 Pa to 2751 Pa. It appears that SMO is a stronger plasticizer than SMS, and thus demonstrates an opposite trend relative to increases in the proportion of SMS in the gel. Obviously, SMO containing gels are much softer than SMS containing gels, for example, a 6% EC 22 cp gel containing 3% SMO has a G' of 3933 Pa, while a similar gel containing 3% SMS displays a G' of 6762 Pa. The effect is even more marked for a 6% EC 22 cp gel containing 4% SMS or SMO, where the G' of the SMS gel is 24630 Pa while the SMO gel displays a G' of only 2751 Pa. Thus, the choice of amount of ethylcellulose and amount and type of surfactant can be used to tailor the oleogels for any desired application.

Example 8

Figure 4:
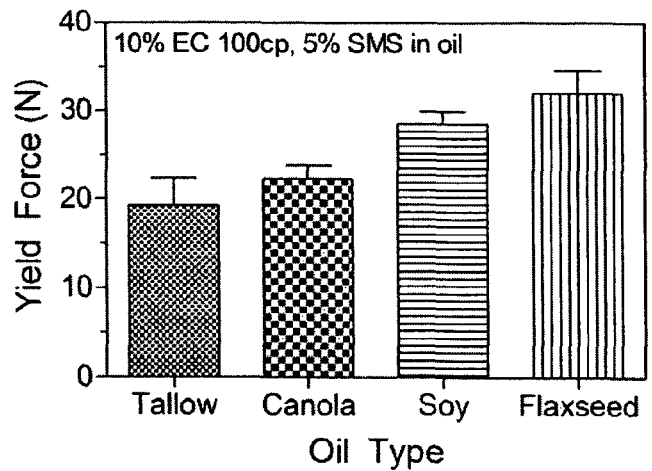
FIG. 4 shows measured gel strength versus oil type for a series of oil-ethylcellulose-surfactant oleogels.

The effect of varying the type of oil used to make the oleogels was studied by comparing the viscoelastic properties of oleogels made with tallow, Canola oil, Soy oil and Flaxseed oil. Each gel contained 10 wt. % of ETHOCEL 100 cp and 5 wt. % of SMS. Each gel was made by heating the mixture to 150° C. to dissolve the components, followed by cooling to ambient temperature to set the gel. All four oils formed strong gels. FIG. 4 shows the measured yield stresses of the resulting gels, showing the effect of varying the oil. It can be seen that the gel strength increases in the order Tallow<Canola<Soy<Flaxseed.

Example 9

A series of meat emulsion products were prepared incorporating organogels prepared from liquid vegetable oils. They were compared with the same meat emulsion system using conventional beef fat and rendered beef fat. Further comparative examples were prepared using organogels of conventional beef fat and rendered beef fat in the same emulsion system. The samples were cooked at different heating rates to evaluate properties. The method was as follows.

Lean meat cuts were chopped in a silent cutter for a short period of time to open up the structure and increase the surface area of the meat. This was followed by the addition of 2% salt and 0.25% polyphosphate which helps to extract several of the meat proteins. This was done while continuing chopping. This was followed by few minutes of break to allow time for protein extraction. Next, animal fat and/or vegetable oil was added and chopped at the high speed setting to reduce fat/oil globule particle size. In the particular products produced here, animal fat and/or vegetable oils were added to the lean beef meat (usually containing 5-10% fat) to obtain the target fat/oil level of 25% in the final meat emulsion. Beef fat and vegetable oils were used in their native state or prepared as ethylcellulose oleogels and added to the product. The meat emulsion was then chopped until a desired homogenous texture was obtained. The products described here were formed into about 25 mm diameter sausages and cooked in plastic casings placed in a water bath and processed at a slow (0.5° C./min) and fast (3.7° C./min) heating rate up to 72° C.

The oleogels used in this example were prepared from regular beef fat, rendered beef fat, canola oil, soy oil and flaxseed by heating a 85% fat/oil, 10% ETHOCEL 100 cp and 5% sorbitan monostearate (Span 60) solution up to 180° C. to 190° C. to dissolve all ingredients and produce a uniform mass. This was followed by cooling and hardening of the gels which were later added to the bowl chopper and incorporated into the meat emulsion.

Fluid separated from the emulsions during cooking (cook loss) was measured, after cooling in a cold-water bath for 5 min, and is expressed as the ratio of liquid expelled (g) to raw batter weight (percent loss). The samples were kept in a 5° C. cooler overnight, so fat/oil floated to the top and could be determined separately.

Texture analysis of the cooked emulsions was performed as follows. After an overnight storage (5° C.), a standard texture profile analysis (TPA) test was performed (Bourne, 1978. *Food Technology,* 32:62-66). Briefly, cooked meat cores (16 mm diameter, 10 mm high) were compressed twice to 75% of their original height by a texture analyzer at a crosshead speed of 1.5 mm/s. The parameters determined (hardness, springiness, cohesiveness, chewiness, and gumminess) were automatically calculated by computer software attached to the analyzer. The results are summarised in FIG. 3, as follows:

T1—Beef fat heated at 0.5° C./min
T2—Beef fat heated at 3.7° C./min
T3—Beef fat organogel heated at 0.5° C./min
T4—Beef fat organogel heated at 3.7° C./min
T5—Canola oil heated at 0.5° C./min
T6—Canola oil heated at 3.7° C./min
T7—Canola oil organogel heated at 0.5° C./min
T8—Canola oil organogel heated at 3.7° C./min
T9—Soy oil heated at 0.5° C./min
T10—Soy oil heated at 3.7° C./min
T11—Soy oil organogel heated at 0.5° C./min
T12—Soy oil organogel heated at 3.7° C./min
T13—Flaxseed oil heated at 0.5° C./min
T14—Flaxseed oil heated at 3.7° C./min
T15—Flaxseed oil organogel heated at 0.5° C./min
T16—Flaxseed oil organogel heated at 3.7° C./min
T17—Rendered beef fat heated at 0.5° C./min
T18—Rendered beef fat heated at 3.7° C./min
T19—Rendered beef fat organogel heated at 0.5° C./min
T20—Rendered beef fat organogel heated at 3.7° C./min It can be seen that when the traditional beef fat was used in a form of organogel the hardness values of the resulting meat product increased; both in the native and rendered beef fat. However, organogels prepared from vegetable oils resulted in exactly the opposite effect. The reduction in hardness was between 30 and 50% which is very distinctive and implies different interactions between the vegetable oil organogels and the meat matrix system. After this reduction, the hardness values were at the same level as the conventional meat emulsion prepared with beef fat. Similar results are shown for the measured springiness, cohesiveness, chewiness and gumminess of the formulations. Hence using the new organogel technology should be very attractive to processors and consumers alike.

The hardness of the conventional beef fat meat products was not affected by the heating rate. Increasing the heating rate resulted in lower cook loss in the conventional finely chopped meat batters. Overall, the cook loss consisted only of moisture (i.e., no fat loss) in these 25% fat/oil products, indicating a good fat holding capacity (i.e., stable meat emulsions). When beef fat was prepared as an organogel, the same trend was observed for cook loss. However for vegetable oils (canola, soy, and flax) and rendered beef fat (fat heated and separated from tissue), the opposite effect was observed; i.e., organogel treatments showed higher liquid losses compared to using the oils in their native form. This indicates different interactions of the organogels within the protein matrix, but in any case the level of about 1% cook loss seen in the organogel treatments is well within the acceptable level of the meat industry.

Overall, the concept of using organogels in a meat system is novel and the fact that the organogels affect hardness as well as liquid retention, regardless of heating rate, is a very promising to the meat processors as well as to consumers. It is also important to be mention that the organogel prepared form the rendered beef fat resembled the behavior of the three vegetable oils (showing same trend in texture and cook loss) and not of the native beef fat.

The present invention provides novel methods of preparing anhydrous polymer oil gels having the properties required for use in a food product. The polymer gels can be used in a variety of applications such as to replace unhealthy fats in food, to prevent oil migration in food products and to increase stability under various conditions. The food products of the present invention exhibit increased resistance to thermal, chemical and physical challenges.

The above embodiments have been described by way of example only. Many other embodiments falling within the scope of the accompanying claims will be apparent to the skilled reader.

The invention claimed is:

1. An edible oleogel, the oleogel comprising from about 70 wt % to about 95 wt % of an oil, ethylcellulose and a surfactant wherein the ethylcellulose-to-surfactant ratio is from 10:1 to 1:1 w/w and wherein the surfactant is not indigenous to the oil and wherein the oleogel is substantially anhydrous.

2. The oleogel of claim 1, wherein the surfactant is provided in an amount effective to provide the oleogel with a gelation temperature of from about 40° C. to about 90° C.

3. The oleogel of claim 1 or 2, wherein the oil is a highly polyunsaturated oil.

4. The oleogel of claim 3, wherein the oil is soybean oil, flaxseed oil or corn oil.

5. The oleogel of claim 1, wherein the surfactant is selected from the group consisting of Polyoxyethylene sorbitan monooleate (Tween 80), Polyoxyethylene sorbitan monostearate (Tween 60), Sorbitan monooleate (SMO or Span 80), Sorbitan monostearate (SMS or Span 60), Glyceryl monooleate (GMO), Glyceryl monostearate (GMS), Glyceryl monopalmitate (GMP), Polyglyceryl ester of lauric acid-polyglyceryl polylaurate (PGPL), Polyglyceryl ester of stearic acid-polyglyceryl polystearate (PGPS), Polyglyceryl ester of oleic acid (PGPO)-Polyglyceryl polyoleate (PGPO), and Polyglyceryl ester of ricinoleic acid (PGPR)-Polyglyceryl polyricinoleate (PGPR).

6. The oleogel of claim 5, wherein the surfactant is selected from the group consisting of SMS, GMS, SMO, GMO and PGPL.

7. The oleogel of claim 6, wherein the surfactant is SMS.

8. The oleogel of claim 1, wherein the oil does not comprise olive oil.

9. The oleogel of claim 1, having a G'/G" greater than about 1 when measured at 1 Hz and 20° C.

10. A chocolate composition comprising the oleogel of claim 1.

11. A food composition comprising an oleogel comprising from about 70 wt % to about 95 wt % of an oil, ethylcellulose and a surfactant, the food composition further comprising one or more carbohydrates, proteins, dietary fibers, or mixtures thereof, wherein the ethylcellulose-to-surfactant ratio is from 10:1 to 1:1 w/w and wherein the added surfactant is not one that naturally occurs in the oil and wherein the oleogel is substantially anhydrous.

12. A food composition according to claim 11, comprising a meat.

13. A food composition according to claim 12, which is a ground meat product or a meat emulsion product.

14. The food composition of claim 11, wherein the ethylcellulose is ethylcellulose 10 centipoise, ethylcellulose 22 centipoise, ethylcellulose 45 centipoise, or a combination of these.

15. The food composition of claim 14, wherein the ethylcellulose is effective to provide the oleogel with a gelation temperature of from about 40° C. to about 90° C.

16. The food product of claim 11, having a G'/G'' greater than about 1 when measured at 1 Hz and 20° C.

17. The food composition of 11, comprising a chocolate composition.

18. A method of preparing a food product, said method comprising:
  a) preparing a mixture of ethylcellulose, sorbitan monostearate (SMS) and an oil at a ratio of 18:6:76 w/w/w;
  b) heating the mixture to a temperature above the glass transition temperature of the ethylcellulose polymer while mixing;
  c) adding this mixture to a reduced fat, heated food composition at 60° C. to 90° C. at a ratio of mixture to food composition of 1:3 to 1:9 (w/w); and
  d) cooling the mixture composition with added mixture to provide the food product.

19. The method of claim 18, wherein the food product comprises a chocolate composition.

20. A method of preparing an edible oleogel, said method comprising:
  a) preparing a mixture of food-grade ethylcellulose in from about 70 wt % to about 95 wt % of an edible oil;
  b) adding a surfactant to the ethylcellulose and oil mixture in an ethylcellulose-to-surfactant ratio of from 10:1 to 1:1 w/w;
  c) heating the ethylcellulose/oil/surfactant mixture to a temperature above the glass transition temperature of the ethylcellulose with mixing, and
  d) allowing the mixture to cool thereby forming said oleogel.

21. The method of claim 20, wherein the amount of the surfactant is effective to provide the oleogel with a gelation temperature of from about 40° C. to about 90° C.

22. The food composition of claim 20, wherein the ratio of ethylcellulose to surfactant is from about 4:1 to about 2:1 w/w.

23. The food composition of claim 22, wherein the surfactant is present in an amount from 2.5 wt % to 5 wt % based upon the total weight of the oleogel.

24. The method of claim 20, further comprising incorporating the oleogel into a chocolate composition.

25. An edible oleogel comprising from about 70 wt % to about 95 wt % of an oil, ethylcellulose and a surfactant wherein the gelation temperature of the oleogel is lower than the gelation temperature of the same oleogel without the surfactant and wherein the surfactant is not one that naturally occurs in the oil and wherein the oleogel is substantially anhydrous.

26. A chocolate composition comprising the edible oleogel of claim 25.

27. A food composition comprising an oleogel comprising from about 70 wt % to about 95 wt % of an oil, ethylcellulose and a nonionic surfactant, the food composition further comprising one or more carbohydrates, proteins, dietary fibers, or mixtures thereof, wherein the gelation temperature of the oleogel is lower than the gelation temperature of the same oleogel without the surfactant and wherein the surfactant is not one that naturally occurs in the oil and wherein the oleogel is substantially anhydrous.

28. The food composition of claim 27, comprising a chocolate composition.

* * * * *